US006677900B1

United States Patent
Thouvenel et al.

(10) Patent No.: US 6,677,900 B1
(45) Date of Patent: Jan. 13, 2004

(54) SYSTEM FOR DETECTING MOBILE RECEIVERS, USING DIGITAL TELEBROADCASTS TRANSMISSIONS OF A GROUND TRANSMITTER NETWORK

(75) Inventors: Gérard Thouvenel, Croissy sur Seine (FR); Marc Lesturgie, Palaiseau (FR); Dominique Poullin, Chatillon (FR)

(73) Assignees: Thales, Paris (FR); Office National d'Etudes de Recherches Aerospatiales, Chatillon (FR)

( * ) Notice: Subject to any disclaimer, the term of this patent is extended or adjusted under 35 U.S.C. 154(b) by 0 days.

(21) Appl. No.: 10/070,426
(22) PCT Filed: Sep. 17, 1999
(86) PCT No.: PCT/FR99/02216
§ 371 (c)(1),
(2), (4) Date: Jun. 18, 2002
(87) PCT Pub. No.: WO01/22117
PCT Pub. Date: Mar. 29, 2001

(51) Int. Cl.[7] .................................................. G01S 3/02
(52) U.S. Cl. ........................ 342/464; 342/104; 342/452
(58) Field of Search ........................ 342/20, 104, 109, 342/196, 464, 452, 458; 600/442, 443, 453

(56) References Cited

U.S. PATENT DOCUMENTS 3,863,256 A * 1/1975 Smith .................... 343/112 B
5,964,706 A * 10/1999 Mo et al. .................... 600/443

FOREIGN PATENT DOCUMENTS

EP 0 681 190 11/1995

OTHER PUBLICATIONS

B. Carrara et al.: "The MUTE radar (Multistatic using television emimitters radar)" International Conference on Radar, pp. 426–431 May 3, 1994–May 6, 1994.
H.D. Griffiths et al.: "Television–based bistatic radar" IEE Proc. Commun. Radar Signal Process., vol. 133, No. 7, pp. 649–657 12/86.

* cited by examiner

Primary Examiner—Dao Phan
(74) Attorney, Agent, or Firm—Oblon, Spivak, McClelland, Maier & Neustadt, P.C.

(57) ABSTRACT

A system for detecting mobile bodies, using digital telebroadcasting transmissions of an array of terrestrial transmitters. The digital telebroadcast transmissions include a plurality of carriers, afforded symbol-based digital modulation, processed by carrier-wise orthogonal frequency multiplexing. After its reception stages, the receiver includes a processor for performing a discrimination of backscattering the transmissions, according to distance/Doppler bins. A reference pathway receives and demodulates the direct signal received from one of the transmitters. The processor includes a Doppler distribution, the Doppler pathways of which are each assigned to a respective frequency shift, then a distance compressor that yields samples arranged in the distance/Doppler bins. After coherent Doppler integration, a postprocessing with tracking contrasts the echoes obtained in these bins, to obtain radar plots containing position/velocity information on one or more objects.

10 Claims, 7 Drawing Sheets

SYSTEM FOR DETECTING MOBILE RECEIVERS, USING DIGITAL TELEBROADCASTS TRANSMISSIONS OF A GROUND TRANSMITTER NETWORK

DISCUSSION OF THE BACKGROUND

1. Field of the Invention

The invention relates to the detection, the pinpointing and the determination of the velocity of mobile bodies in the vicinity of the ground by a bi-static radar system.

2. Background of the Invention

The document "Multimode multistatics for passive/active airborne surveillance, Robert F. Ogrodnik, Rome Air Development Center, Griffiss AFB N.Y. 13441-5700, CP381 (Supp) presents the use of existing public telebroadcasting transmissions as transmission signals of a bi-static radar, which thus benefits from extended geographical coverage and absolute discretion. The functions of the detection, pinpointing and determination of the velocity are carried out by deploying a distinct array of receivers, covering the observation zone, associated with centralized processing of the information originating from the backscattering of the signals by a mobile body.

It is possible to evaluate the performance of such a concept by applying the general laws of radar to the current characteristics of analog telebroadcast transmissions. Thus, the presence of line synchronization in the telebroadcast signals leads to a plurality of solutions for distance measurement; likewise, the accuracy of this measurement, inversely proportional to the useful bandwidth of the transmission signals, cannot be other than mediocre.

The advent of digital television has prompted a complete rethink of the nature of the transmission signals, leading to the definition of a COFDM (Coded Orthogonal Frequency Division Multiplex) standard, exhibiting numerous technical advantages, elimination of disturbing echoes for example, and commercial advantages, a large number of accessible programs.

SUMMARY OF THE INVENTION

The present invention aims to utilize, in the field of radar, such digital signals.

Accordingly, it uses telebroadcast terrestrial transmissions, which commonly operate on the basis of a plurality of fixed frequency carriers, afforded a symbol-based digital modulation, processed by carrier-wise orthogonal frequency multiplexing.

A receiver for detecting mobile objects which uses such radio transmitters, may be regarded as known ("Le radar muet" [The silent radar], B. CARRARA, P. TOURTIER, M. PECOT; Radar Colloquium 1994, Palais des Congrès, Paris) and which comprises:

- radioelectric reception means, for picking up the signals backscattered by objects under the effect of said radio transmitters,
- processing means for performing a discrimination of such objects according to distance/Doppler bins, and
- auxiliary means for acquiring a synchronization reference with respect to the transmitters, so as to clamp these distance/Doppler bins in time.

The invention proposes a receiver, characterized in that it comprises (auxiliary) means for receiving and demodulating the direct radio telebroadcast signal received from one at least of the transmitters, so as to determine their instants of synchronization and their symbols, and in that the processing means comprise:

- Doppler distribution means, able to apportion the signals received according to a plurality of Doppler pathways, while affording them in each pathway a frequency shift associated with the rank of this Doppler pathway,
- distance compression means, able to form the sum, for all the carriers, of the correlations, in homologous forms, of the output of each Doppler pathway with the symbols available at the output of the auxiliary means, thereby yielding samples arranged in distance/Doppler bins,
- means of coherent Doppler integration over a chosen time, thereby yielding integrated distance/Doppler bins, and
- means of postprocessing with tracking, devised so as to contrast the echoes obtained in these bins, so as to obtain radar plots containing position/velocity information on one or more objects.

Preferably, the receiver includes, at the output of its radioelectric reception stage, an analog/digital converter, followed by a HILBERT transform stage, so as to obtain amplitude/phase complex digital signals. The Doppler distribution means and the subsequent stages operate digitally.

Very advantageously, the distance compression means comprise Fourier transformation stages on sliding temporal data trains arising from the Doppler distribution, thereby regenerating the symbols as received, then temporal correlators thereof with the output of the auxiliary means, and a summator of the output of the correlators for the set of carriers.

It is currently preferred that the radioelectric reception means comprise an array antenna, and that the processing means operate selectively on pathways respectively associated with distinct antenna elements or groups of antenna elements, up to the postprocessing means, which at the head end comprise means of recombination of the outputs of these pathways, with a view to beam formation. Preferably, the beam recombination means operate adaptively, as a function of the mobile bodies tracked and the echoes observed.

According to another aspect of the invention, the postprocessing means comprise a multistatic processing stage, for defining each radar plot on the basis of several transmitter/receiver pairs.

The invention also envisages a system for detecting mobile objects, which comprises several receivers sited at chosen places, and means for contrasting the radar plots which these receivers yield.

According to a beneficial adjunct, in addition to the telebroadcasting transmitters proper, the system comprises additional transmitters sited at chosen places and operating with the same modulation as the telebroadcasting transmitters proper.

Another variant consists in supplementing the system with means for addressing service information to the telebroadcasting transmitters, for the purposes of retransmission in their modulation.

BRIEF DESCRIPTION OF THE DRAWINGS

Other characteristics and advantages of the invention will become apparent on examining the detailed description below, and the appended drawings, in which.

DETAILED DESCRIPTION OF THE PREFERRED EMBODIMENTS

The appended drawings comprise elements of definite nature. They are therefore to be regarded as incorporated into the description, and may serve not only to better elucidate the latter, but also to contribute to the definition of the invention.

Figure 1:
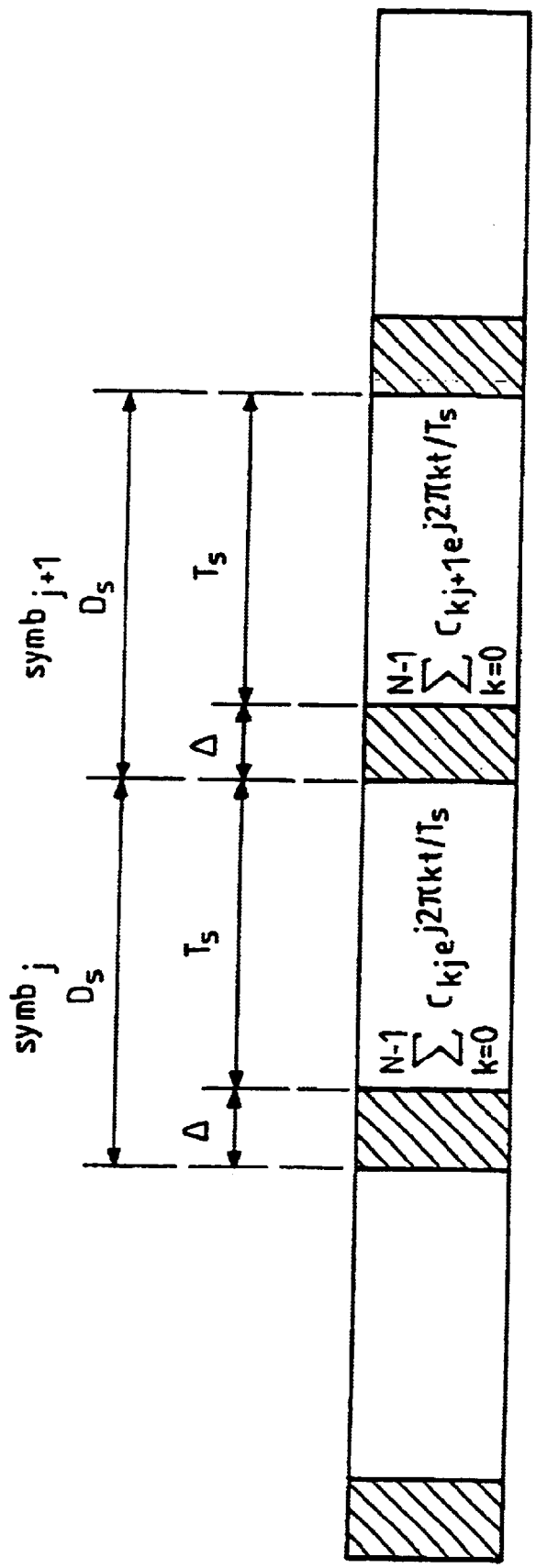
FIG. 1 is a time chart illustrating the COFDM signal coding mode.

COFDM modulation will firstly be presented with reference to FIG. 1. This is described in particular in the article "Digital Sound Broadcasting to Mobile Receivers", B. LE FLOCH, R. HALBERT-LASSALLE, D. CASTELAIN, IEEE Transactions on Consumer Electronics, Vol. 35, No. 3, August 1989.

It is envisaged that the digital telebroadcast be made according to this type of modulation, in particular for television. This involves using an appropriate grid of terrestrial transmitters, covering all or almost all the broadcasting territory.

The COFDM modulation uses a large number (typically several thousand) of equidistant subcarriers (here we shall speak of carriers, for simplicity). The latter are modulated at low frequency, independently, by appropriate codes, which depending on the application may in particular be a phase shift coding with Q moments (Q Phase Shift Keying or QPSK) or else an amplitude modulation coding with Q moments (Q Amplitude Modulation or QAM).

The basic element of the modulation is the "symbols".

On reception, a scalar product is formed, to which is applied an integration whose duration is strictly equal to the inverse of the frequency spacing of the carriers. This gives rise to the orthogonality of the carriers on reception, thereby making it possible to recover the symbols without crosstalk.

The duration of a symbol is substantially longer than the inverse of the spacing of the frequency of the carriers. The difference between these two times defines a "guard interval", which precedes the integrated scalar product operation. It makes it possible to circumvent the dispersion in propagation time which may result from multipaths.

A particular feature of this modulation is that it allows the simultaneous synchronized transmission of several spatially distinct transmitters, provided that their signals reach the receivers in the guard interval. This property is fundamental for the present invention: it makes it possible to cover a geographical zone with a monofrequency network (single-band), unlike current analog television transmissions, for example.

An example of COFDM signals ought now to be described briefly.

Consider a series of digital symbols to be transmitted $SYMB_j(t)$, where t is the time, and j the index of a symbol. The expression for the signal to be transmitted is then given by equation (1) of the. Annex of Formulae (appended to the description).

The expression for a symbol is given by equation (2). The latter calls upon:

a function $\Psi$ defined by equation (3), which itself calls upon equation (4), where $f_k$ designates the frequency of the carrier of rank k, and coefficients $C_{j,k}$ which may take one of the four values defined by relation (5), where i is the usual symbol for the complex imaginaries (in the particular case of 4PSK modulation, with Q=4 moments).

In these relations, $D_s$ and $T_s$ are respectively the total duration and the useful duration of transmission of a symbol, as will be seen later. $\Delta = D_s - T_s$ is the guard interval.

For a given value of $(t-jD_s)$, we distinguish three cases:

if $t-jD_s < -\Delta$, i.e. $t < jD_s - \Delta$, the function $\Psi$ is zero;

if $t-jD_s > T_s$, i.e. $t > jD_s + T_s$, the function $\Psi$ is zero;

in the interval between the two, the function $\Psi$ is given by expression (6).

The frequencies are therefore coded independently with the aid of a code with four phase states defined by the permitted "alphabet" for the complex coefficients $C_{j,k}$, according to relation (5).

As illustrated in FIG. 1, these frequencies are transmitted over the duration $D_s = \Delta + T_s$. They are however orthogonal over the duration $T_s$. The time interval of duration $\Delta$ is the guard interval, intended for attenuating the inter-symbol correlation problems related to the propagation channel (multipaths in particular, which may appear in the hatched zones of FIG. 1). The duration of analysis for the decoding (in radiocommunications) of the signals received is thus limited to $T_s$.

The COFDM modulation uses a comb of equidistant carriers. They are orthogonal, for a scalar product corresponding to their crosscorrelation function, calculated during the inverse of their frequency gap.

Each of these carriers carries, for a duration $D_s$, a symbol corresponding to a phase state (or, more generally, modulation state), chosen for example from among Q=4 states. This duration $D_s$ corresponds precisely to the inverse $T_s$ of the comb gap, plus the guard interval $\Delta$. Also, the duration of the guard interval $\Delta$ is chosen as an upper bound of the impulse response of the transmission channel.

After each time interval corresponding to this duration $D_s$, a so-called "line", the symbol to be transmitted is renewed, this being done a number of times so as to organize a "frame".

At the head of the frame, and for a chosen duration, the symbol corresponding to the zero phase is transmitted on each subcarrier so as to allow acquisition or identification of the frequency response of the transmission channel.

A number of synchronization signals are also transmitted at the start of the frame. They make it possible to reconstruct, on reception, the carrier frequency, the line duration, the identification of the transmitter, to organize the calibration phases for determining the impulse response for each carrier, and to tag the start instant of the useful duration of transmission of a symbol or to determine the duration of the guard interval.

The receiver of such a radiocommunication signal is here regarded as known.

The splitting into frames will not be discussed again subsequently. Specifically, it intervenes essentially in the head-end reception stages, which are regarded as known. However, it is necessary to contrive matters such that the associated processing, in particular in respect of calibration and the start of the line, is reliable to the accuracy required for the radar processing proposed.

It is tempting to use terrestrial radar transmissions in bi-static radar mode: low cost on the transmission side, since the transmitters pre-exist, with already allotted frequencies; low transmission frequencies, advantageous for detecting stealthy mobile bodies (intrusion of small aircraft for example), and detrimental to active neutrodyning (among other simulations), as well as to the guidance of aggressive mobile bodies; continuous operation assured in principle.

In the radar art, bi-static detection is described in particular in "Multi-(bi)-static High Frequency (PO/GO) Radar Target Imaging of Airborne Scatterers" by S. K. CHAUDHURI et W. M. BOERNER, AGARD, CP 381, 1985.

The interaction between terrestrial transmissions and aircraft is also studied in the article "Interference To Satellite Earth Stations Due to Scatter of Terrestrial Transmissions by Aircraft", J. V. MURPHY, Australian Telecommunications Review, Vol. 17, No. 1, 1983.

Figure 2:
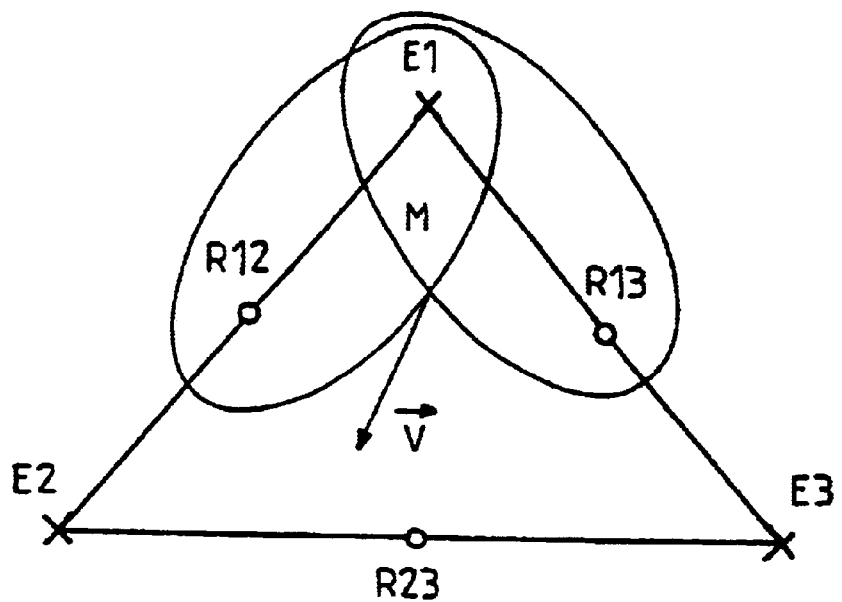
FIG. 2 is a diagram illustrating a bi-static position detection on the basis of three transmitters, which here are illustrated at the vertexes of a substantially equilateral triangle.

The principle of bi-static detection is illustrated in FIG. 2. We consider three terrestrial radar transmitters E1 to E3, in the ideal or "canonical38 (in theory) configuration as an equilateral triangle. Three receivers are envisaged: R12 substantially in the middle of the segment joining E1 and E2, R23 substantially in the middle of the segment joining E2 and E3, and R13 substantially in the middle of the segment joining E1 and E3.

A mobile body M (at least) is moving with a velocity vector $\vec{V}$. The cooperation of each receiver with one of the transmitters makes it possible firstly to acquire information on the relative velocity of the mobile body (Doppler information). As far as the position is concerned, it also makes it possible, under certain provisos, to determine an ellipsoid in which the mobile body M lies, the foci of this ellipsoid being the associated transmitter and the associated receiver.

The possibility of performing Doppler measurements (of bi-static radar type) on the basis of telebroadcast terrestrial radar transmitters has been known for some time.

On the other hand, technical reasons related to the modulations used make it very difficult to measure distance with today's analog terrestrial radio transmitters. These reasons are multifold and are to do with the fact for example that the television line frequency introduces numerous distance ambiguities and that the useful frequency band in the luminance signal is narrow. The capacity of detection of mobile bodies having a weak signature and low velocity in the presence of a very considerable level of clutter is thus made problematic.

The emergence of COFDM modulation, used in the UHF or VHF bands, has revived the interest of certain radar engineers with regard to bi-static detection based on radio transmitters.

As far as the Doppler measurements are concerned, the multicarrier aspect of the COFDM digital signals tends rather to complicate the situation: the resultant Doppler effect has to be referred to a plurality of carrier frequencies of different values modulated independently of one another.

Matters are different as far as the "distance" measurements are concerned. Specifically, through its transmissions made at precise instants (frame), the COFDM process affords a beneficial element, combined with the knowledge of the nature of the "alphabets" of the base codes: the transmission waveform is much less prone to variation than in the case of analog telebroadcasting, even though for an uninformed observer it seems like a noise It is in fact possible, by decoding the direct transmission received in the receivers, to recognize the signal transmitted (that is to say to decode the symbols), even though this signal transmitted is modulated by an unknown source.

This consideration makes it possible to perform on the bi-static signals to be utilized a demodulation before processing which reduces to the case of a transmission which is not modulated by the equivalent of noise.

One of the lynchpins of the present invention is the observation that the ambiguity function of the signal thus processed approaches the customary requirements of radar engineers.

Specifically, it has been observed that the use of a code consisting of a large number of orthogonal frequencies for the symbol duration leads to a white-spectrum broadband signal. This gives the bi-static detection system a beneficial distance discrimination capability and exemplary robustness with regard to interference and multipaths.

This being so, the following difficulties remain:

in order for the ellipsoids of FIG. 2 to be fixed in space, it is necessary for each receiver to be capable of acquiring a synchronization cue, with regard to the transmission of the relevant transmitter. This particularly tricky aspect is developed below, the working assumption according to which the signal would be periodic (with period equal to the inverse of the discrepancy between two neighboring frequencies) cannot be adopted. Specifically, the coefficients $C_k$ must necessarily change from one symbol to another. Otherwise, the radio signal would not convey any information: it is impossible to transmit a cue on the basis of transmitted signals which remain entirely random in the medium term, this being required for the periodicity assumption, on the other hand, it is true that the COFDM signal is similar to temporal noise. This prevents the application to it of conventional radar processing where the distance discrimination and the Doppler discrimination are considered "in parallel" (separately and independently), finally, there is cause to remove the fixed echoes, this also posing a problem, given the dynamic range to be processed (of the order of 95 dB).

As far as the problem of synchronization is concerned, it is technically necessary for all the transmitters to be mutually synchronized. However, for all that, it is nevertheless not easy, at the receiver level, to acquire the desired synchronization with respect to these various transmissions. The use of high-precision clocks for this purpose is necessary, as soon as one wishes to work on transmitter/receiver pairs. A precise temporal tag must still be extracted from the signal received.

It is at this level that the present invention affords an important element, which is such as to allow the development of receivers capable of carrying out effective detection.

Consider a COFDM transmission operating around 300 MHz (nominal carrier frequency indistinct from the subcarriers), with an equivalent radiated isotropic power of 1000 W. There are a number Np=1500 carriers (subcarriers) and they cover a 1.5 MHz band. They are therefore 1 kHz equidistant from one another. The useful duration of the symbols is 1 ms.

Figure 3:
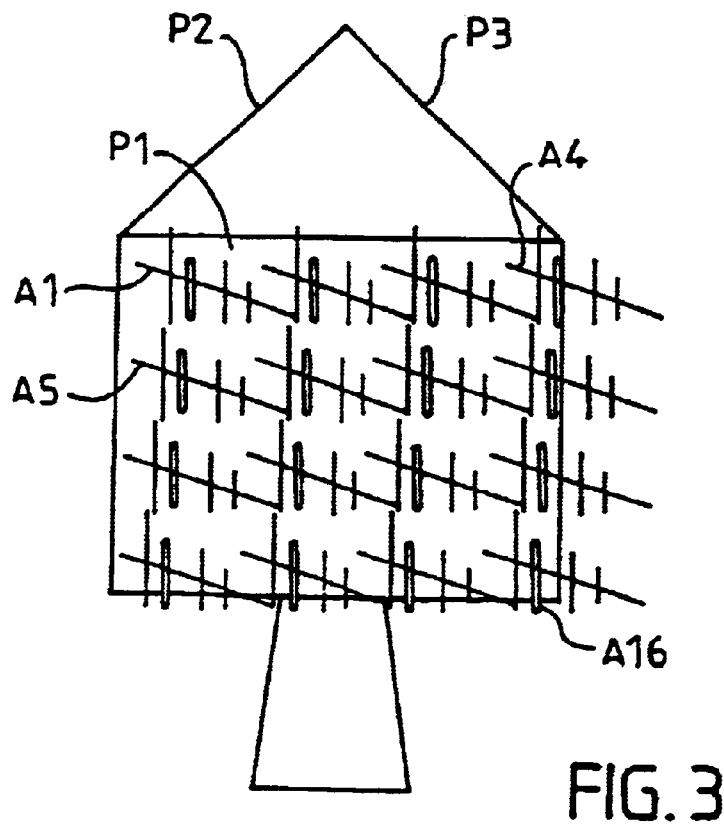
FIG. 3 is the very diagrammatic illustration of an aerial useable in a receiver according to the invention.

One of the basic ideas of the present invention resides in that the receiver is fitted with an array antenna, illustrated very diagrammatically in FIG. 3 in the form of three panels P1 to P3, arranged as an equilateral triangle with a vertical axis of symmetry, so as to cover all directions. Each panel comprises for example 16 antenna elements $A_1$ to $A_{16}$, laid out in a 4×4 matrix, and illustrated here in the form of YAGI antennas. Any other aerial which is substantially isotropic in terms of bearing and which possesses azimuthal gain is suitable. Although plane structures are simpler, it is thought that antenna structures possessing symmetry of revolution with a vertical axis and an outward concave profile would be preferable.

For simplicity, only 8 antenna elements will be considered subsequently.

Figure 4:
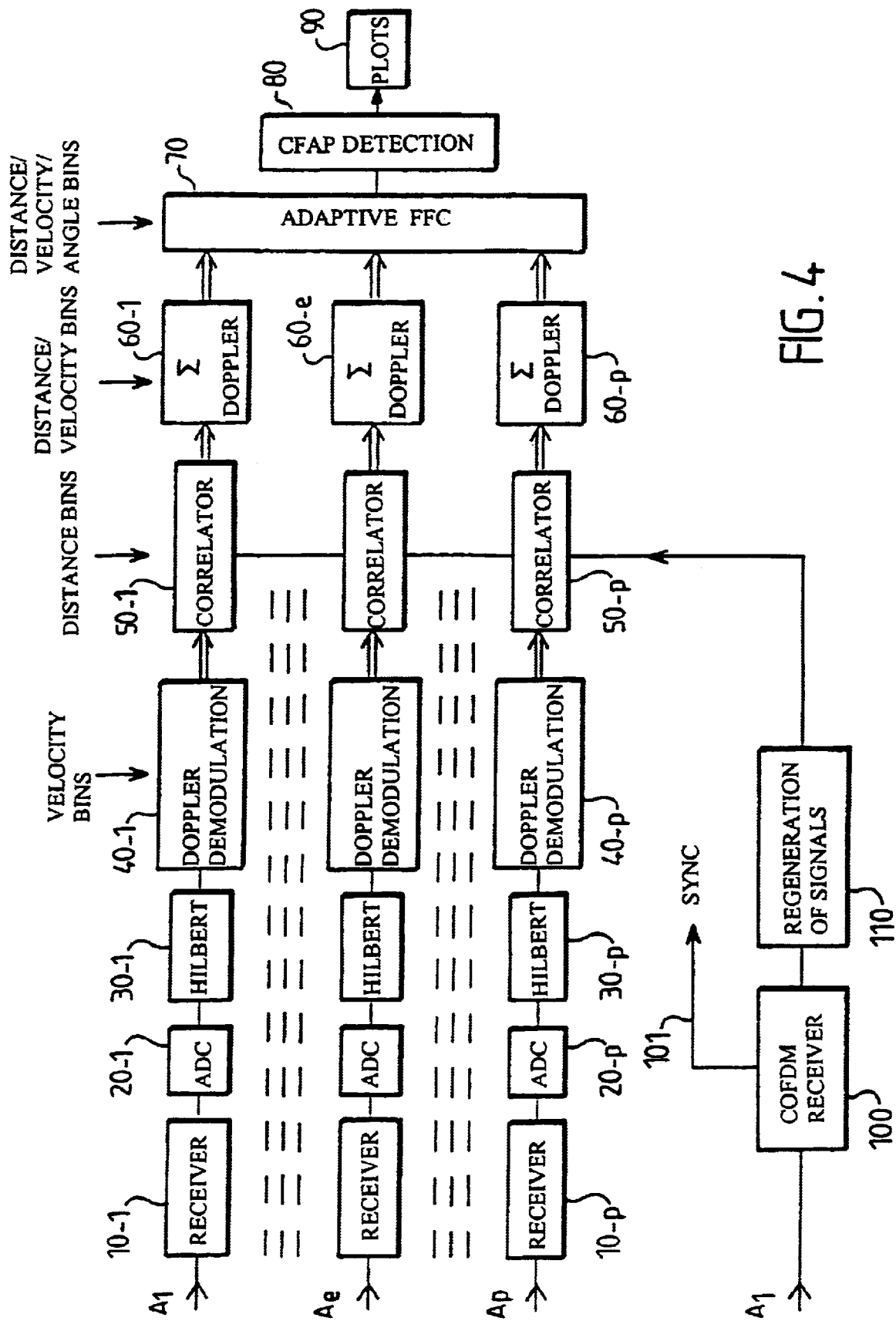
FIG. 4 is the detailed diagram of a receiver useable for the implementation of the invention.

The receiver proper is illustrated in FIG. 4.

According to an important aspect of the invention, the output of one at least of the antennas (here the antenna A1) is received in a conventional manner, such as to detect the telebroadcast signals transmitted.

The head-end stage 100 is therefore similar to the radio-etectric part of a COFDM receiver of conventional type. It possesses an output 101 which yields the signal for time synchronization, with respect to the relevant transmitter, for example the start of the period $T_S$ (FIG. 1). This synchronization makes it possible to define the original differential distance for all the echoes arising from the relevant transmission, since the direct path is the shortest possible. The unit 10 employs it for recreating the temporal reference of the correlation stage 50.

The transmitters themselves are identified without error by the direct path. It is possible to take as reference of the symbols in a receiver those which correspond for example to the closest transmitter, the symbols transmitted by the transmitters being by definition identical, at a given moment.

Next, a stage 110 regenerates the symbols broadcast, by applying processing which is standardized in respect of the relevant broadcasting system, for example the ETSI standard for audio transmissions (Digital Audio Broadcasting or DAB), or the standard currently being drawn up with regard to video transmissions (Digital Video Broadcasting or DVB).

The symbols are regenerated in a format appropriate for being used (in conjugate complex form) at the level of the correlators 50 which will be dealt with later.

The radar processing is now considered.

For each of the antennas $A_e$ (e goes from 1 to P=8), the receiver comprises a respective pathway, which will be described hereinbelow without enlisting the index which appears in the drawing.

The head stage is a radioelectric receiver 10, able to receive the band lying between around 288 and 302 MHz, with similar performance to that required for a telebroadcasting receiver. In a known manner, this receiver includes one or more changes of frequency, for lowering the working band. An analog signal which represents the frequencies and phases of each of the carriers included in the whole of the band received is obtained at output.

This output signal comprises:
 a "direct" signal, of the propagation of waves in a straight line between the transmitter, for example E1 and the receiver, for example R12 (to which are added any multipaths), and
 for at least one backscattering object M (assumed to be present), a "useful" signal of the backscattering of the waves from the transmitter to the receiver by this object (to which are also added any multipaths).

It is known that, seen from the reception side, and for a bi-static radar in general:
 the time discrepancy between the useful signal and the direct signal is, to within a distance ambiguity, representative of the difference between the distances (E1, M)+(M,R12) and (E1,R12), hence the position locations as ellipsoids and,
 the frequency discrepancy between the useful signal and the direct signal is, to within a velocity ambiguity, representative of the algebraic sum of the projections of the velocity vector $\vec{v}$ on the one hand onto the axis (M,E1), and on the other hand onto the axis (M,R12).

After this radioelectric receiver of the bi-static radar type, we switch to digital signals via an analog/digital converter 20.

The next stage 30 is HILBERT transform type processing which makes it possible to extract the complex amplitude and phase components (or real part, imaginary part) of the signals received. $CDS_e$ denotes the two-component complex signal obtained for the antenna element $A_e$.

The sampling frequency is tailored to the total band of the signal and to the number of samples which is required to utilize a Fast Fourier Transform (FFT) over the duration $T_S$ of integration which will allow the extraction of the symbols. This sampling frequency is, in the example chosen, 2.048 MHz.

The subsequent processing is performed while considering for example Nd=500 distance bins. The 1.5 MHz band corresponds to a distance of 100 m in radar mode, i.e. a differential distance domain of 50 km. It will be noted that the theoretical unambiguous distance domain for 1 ms is of the order of 150 km (differentially), hence greater than the customary distance between two terrestrial radio transmitters.

Likewise, we consider a velocity domain of ±500 m/s, with Nv=128 velocity bins, for a useful recurrence rate of 800 Hz and a filtering band of 6.25 Hz.

Figure 7:
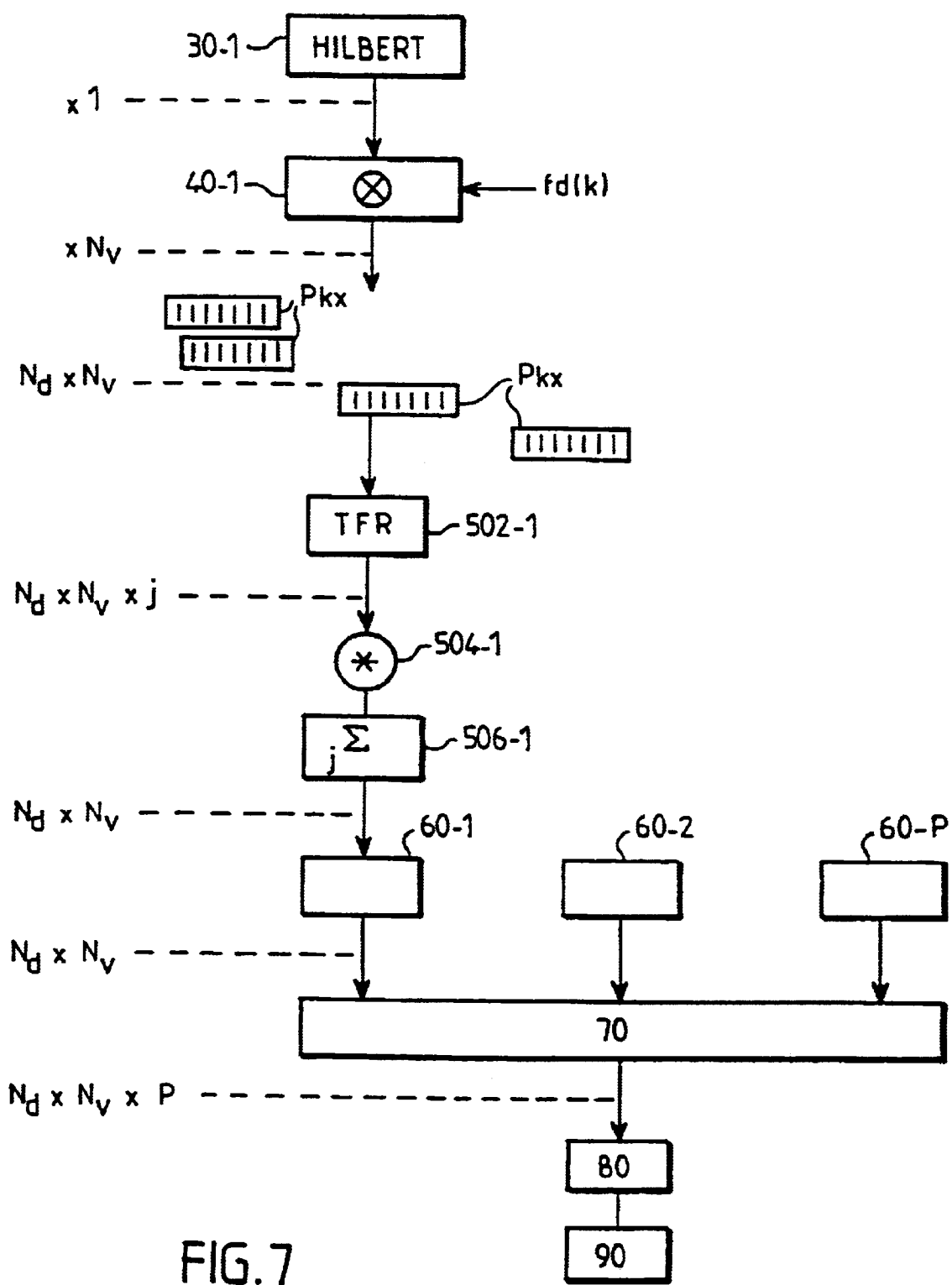
FIG. 7 is a chart showing the multiplicity of signals processed at each juncture.

Reference may subsequently be made to FIG. 7 in order to better appreciate the tree structure (in terms of number) of the signals processed.

In a stage 40, the signal $CDS_e$ is the subject of a Doppler distribution, according to Nv velocity bins (or Doppler bins). Preferably, the spacing between the velocity bins is tailored to the duration of the subsequent Doppler coherent integration.

Figure 5:
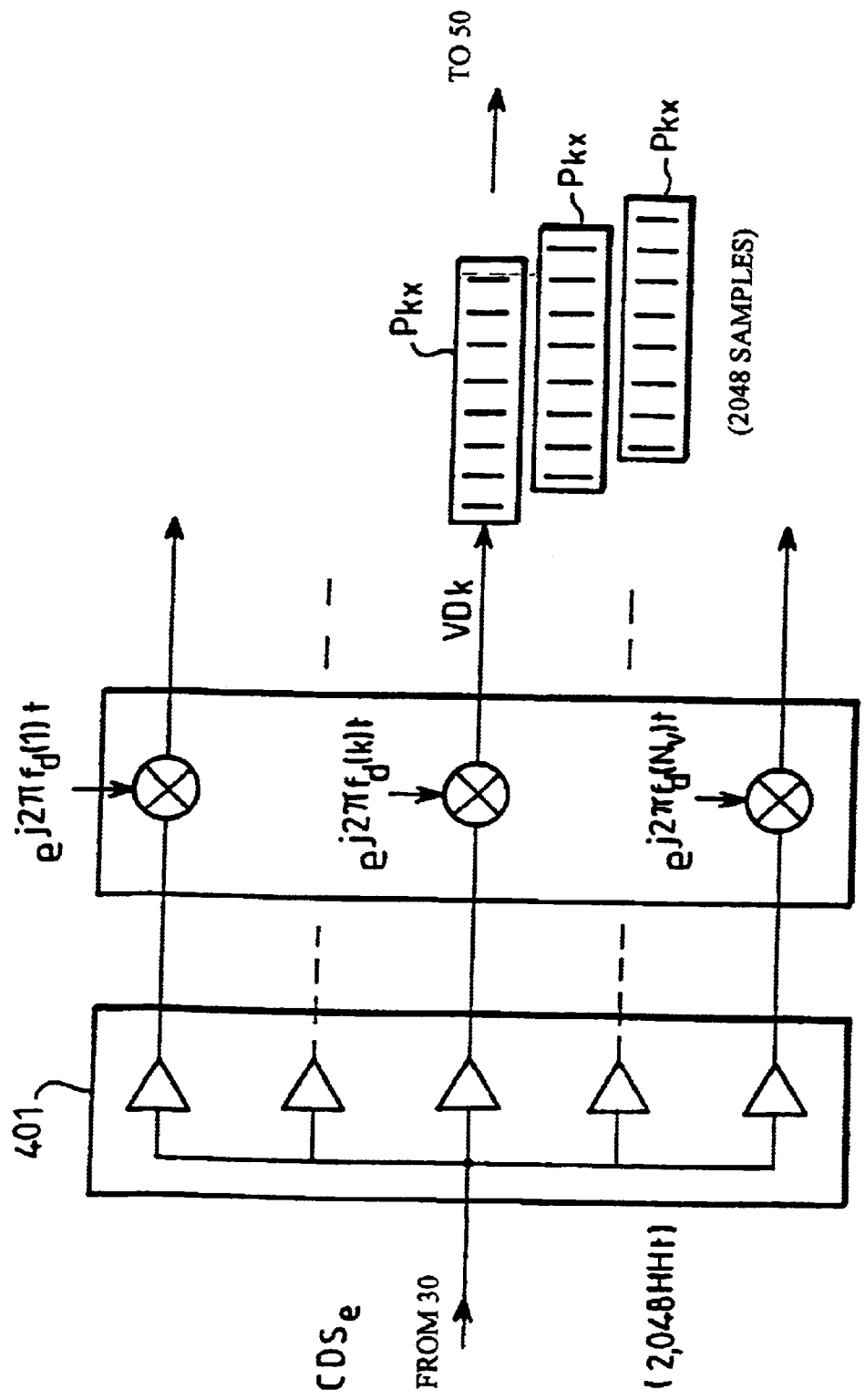
FIG. 5 is the more detailed diagram of the stage 40 of FIG. 4.

Detailed in FIG. 5, the stage 40 comprises a distributor 401, capable of creating the Nv Doppler pathways VDk required (k goes from 1 to Nv). Each Doppler pathway VDk includes a change of frequency stage 403, for lowering the frequency by a value $f_d(k)$, which is the Doppler shift processed by this pathway. Such a change of frequency comprises the product of the input signal times $$\exp(j2\pi f_d(k)t)$$

By virtue of the prior Hilbert filtering, this multiplication operates in sideband only: i.e. a signal received RX including frequencywise a Doppler shift RXd, which goes in the Doppler pathway $f_d(k)$=FXd; the stage 403 yields only the component RXd−FXd, and not RXd+FXd.

Each multiplier 403 therefore performs a "Doppler demodulation". However, the latter pertains only to the frequency discrepancies due to the Doppler effect, in the various Doppler bins defined. It leaves the effect of the multiplicity of carrier frequencies intact.

Thus, the plurality Nv of velocity bins is analyzed as a battery of frequency changes covering the whole of the Doppler domain (or velocity domain) to be processed.

For a given Doppler pathway VDk, the multiplier 403 outputs a train of complex temporal data, which carry at the level of each symbol the (unknown) modulation of the source, doing so for a mobile body which would have the velocity corresponding to the Doppler shift $f_d(k)$ of this pathway.

These temporal data trains are grouped into packets $Pk_x$ of 2048 samples. These packets are "sliding": the next packet is obtained by removing the first sample from the previous packet, and by adding a new sample at the end (the slide spacing could be greater than 1, to the detriment of the expected accuracy). This will subsequently allow the creation of the distance bins. According to a conventional radar technique, it is possible to increase (double or more) the sampling speed, so as to reduce losses from overlapping between distance bins.

Figure 6:
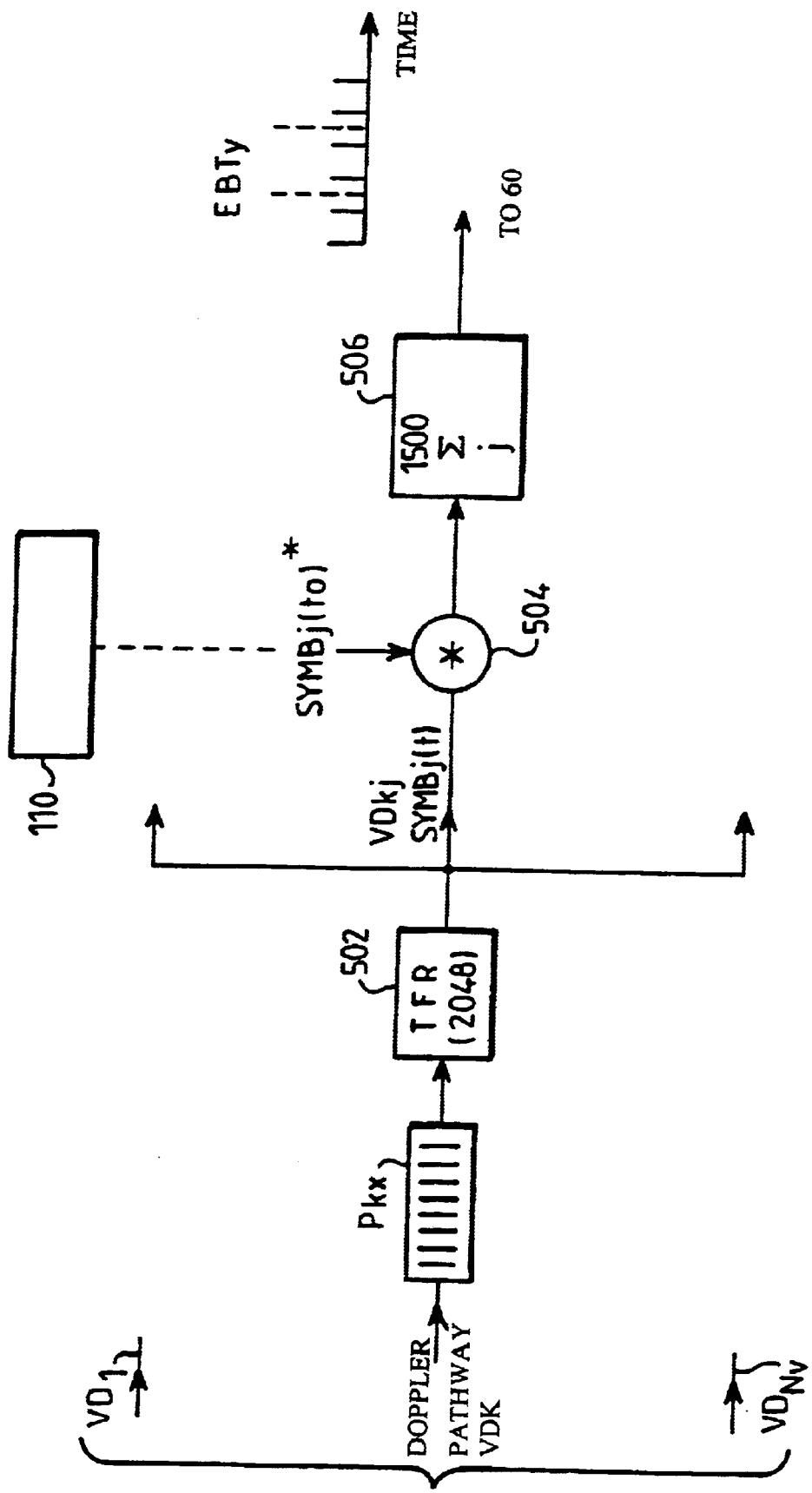
FIG. 6 is the more detailed diagram of the stage 50 of FIG. 4.

The stage 50, detailed in FIG. 6, applies to each packet $Pk_x$ of 2048 samples in succession:

a) a Fast Fourier Transform operation 502 with 2048 points (the power of 2 immediately greater than 1500); each Fourier transformation performed on an incoming packet yields at its outputs the separate demodulation of the 1500 carriers; the 1500 symbols (still unknown) are thus isolated on pathways VDkj (as for the Doppler pathways, k varies from 1 to Nv=128; as for the carriers, j varies from 1 to Np=1500); an output of the FFT, for a Doppler pathway, therefore contains any echo which might relate to the relevant carrier, for a mobile body which would have a velocity included in the Doppler span of the relevant Doppler pathway; the instant of arrival of this echo is related to the sought-after distance information;

b) operations 504 of temporal correlation with the demodulated conjugate symbols on the direct path arising from the unit 110 (FIG. 1), as many times as there are such symbols, here 1500 times; this will allow the determination of the distance bin or bins in which an echo which may correspond to a detected mobile body lies; a correlation spike appears in fact at the instant of this echo; the distance bins are therefore defined directly by the instants of the correlation spikes;

c) an operation 506 of integration or weighted summation on the 1500 useful symbols, thereby formulating the raw samples EBTy of corresponding distance bins, at the rate of 2.048 MHz (or more).

The summation can be weighted by taking account in particular of the frequency response measured on the direct path.

The raw samples EBTy exit in correspondence with the time shifts on the sliding data trains at the input. Their sequencing therefore corresponds to the distance bins. The time reference is extracted from the synchronization signal 101 arising from the stage 100. The shape of the signals can be that illustrated in FIG. 8 (disregarding the Doppler bins).

Considering the FFT operators 502 overall, they perform a Fourier transformation pertaining to a multiple of Nd×Nv points, where Nd is the number of distance bins, and Nv the number of velocity bins (Doppler bins).

At this conjuncture, the operations 502 and 504 have respectively suppressed the effect of the multiplicity of the carriers, and that of their respective modulations. The signals received, have thus been, as it were, "aligned" with one and the same intermediate frequency. At the moment when they are reunited by the summator 506, they therefore carry Doppler information which can be aggregated, in each Doppler pathway.

The coherent Doppler integration is then performed in stages 60, by summation of successive temporal samples EBTy (y from 1 to Nt), brought into coincidence by time shifts according to respective multiples of y times $D_S$, the line duration.

The duration of the Doppler integration is for example 160 ms. This corresponds to the integration of Nt=128 temporal samples of symbols, which follow one another in time for each carrier. In the example chosen, the number of velocity bins Nv=128 and the number of sample taken in a Doppler integration Nt=128 happen to be equal; care will be taken not to confuse these two notions.

It will be observed that the symbols vary from one line to another. However, after compensation for the frequency discrepancies between carriers, the correlation by the conjugate symbols received (and, also, the summation over the set of symbols of one and the same line), $D_S$ can be regarded as an effective recurrence period. On the other hand, in the COFDM electromagnetic signals transmitted, it is not possible to identify precise instants which would mark the periodicity of the recurrence periods thus defined; stated otherwise, no genuine periodicity of duration $D_S$ appears in the signals transmitted.

It should be noted that the preceding operators are not permutable. There is firstly cause to identify the Doppler bins, with the frequency changes required, then to undertake the distance compression, and finally to carry out the coherent Doppler integration.

To summarize, the direct signal arising from one of the transmitters is taken as reference. After allowing for the Doppler components related to the motion of a mobile body which back scatters the transmissions from the same transmitter, a temporal signal arising from the backscattering and comparable with the direct signal is obtained. The temporal discrepancy information obtained designates an ellipsoid in which the relevant mobile body lies.

According to another aspect of the present invention, a stage 70 receives the outputs of all the pathways arising from the various antenna elements. This stage carries out adaptive beam formation by computation, which therefore makes it possible to identify "angular bins" in which the signals actually corresponding to mobile bodies lie, on the basis of the array antenna, while benefiting from the angular selectivity which the latter affords.

The addition of these angular bins makes it possible to switch from ellipsoids (distance information only) to ellipsoid slices delimited by the angular information acquired. However, in cases where two-dimensional detection would suffice (without the altitude), it would be possible to process the intersection of the ellipsoids with a reference surface: ground, geoid, or derivatives thereof.

The position/velocity tracking also yields essential indications for better determination of the position of the mobile bodies in these ellipsoids or slices of ellipsoids.

Thus, the stage 80 makes it possible to carry out Constant False Alarm Processing (CFAP), the principle of which is known, which makes it possible to extract "plots" (data on the mobile body or bodies M) regarding ambient noise.

A stage 90 will then make it possible, by merging the multistatic data, to resolve any corresponding ambiguities, to determine effective plots in which the mobile bodies lie, this time in the form of an absolute spatial tag in terms of distance and velocity. Stated otherwise, each of these plots may be associated with a position/velocity state vector, which can then be followed or tracked, in a known manner.

This resolving of ambiguities will be performed by association of the raw plots detected and positional and relative velocity likelihood processing (so-called "Multi Hypothesis Tracking", and/or published patent FR-A-2 709 184). Specifically, the transmissions are identical. The energy per symbol is insufficient for it to be possible to identify the transmitter on the basis of the signals scattered by the mobile bodies. The plots detected are therefore a priori undifferentiated in the receivers from the point of view of the original transmitter.

Distinction between the radar plot source transmitters is therefore performed on the one hand by using the directivity of the array of reception antennas, and on the other hand in accordance with the temporal and Doppler shifts of the signals scattered by the mobile bodies, which it will be possible to follow.

The directivity of the array antenna is naturally assessed while allowing for its shape.

Thus, ordered temporal association processing (ordered for example by ascending temporal discrepancy with respect to the direct path of a given transmitter in a given receiver), including the latest position hypotheses, and the associated likelihood of the relative velocity measurements, allows ambiguity resolution and access to "extracted plots".

Figure 8:
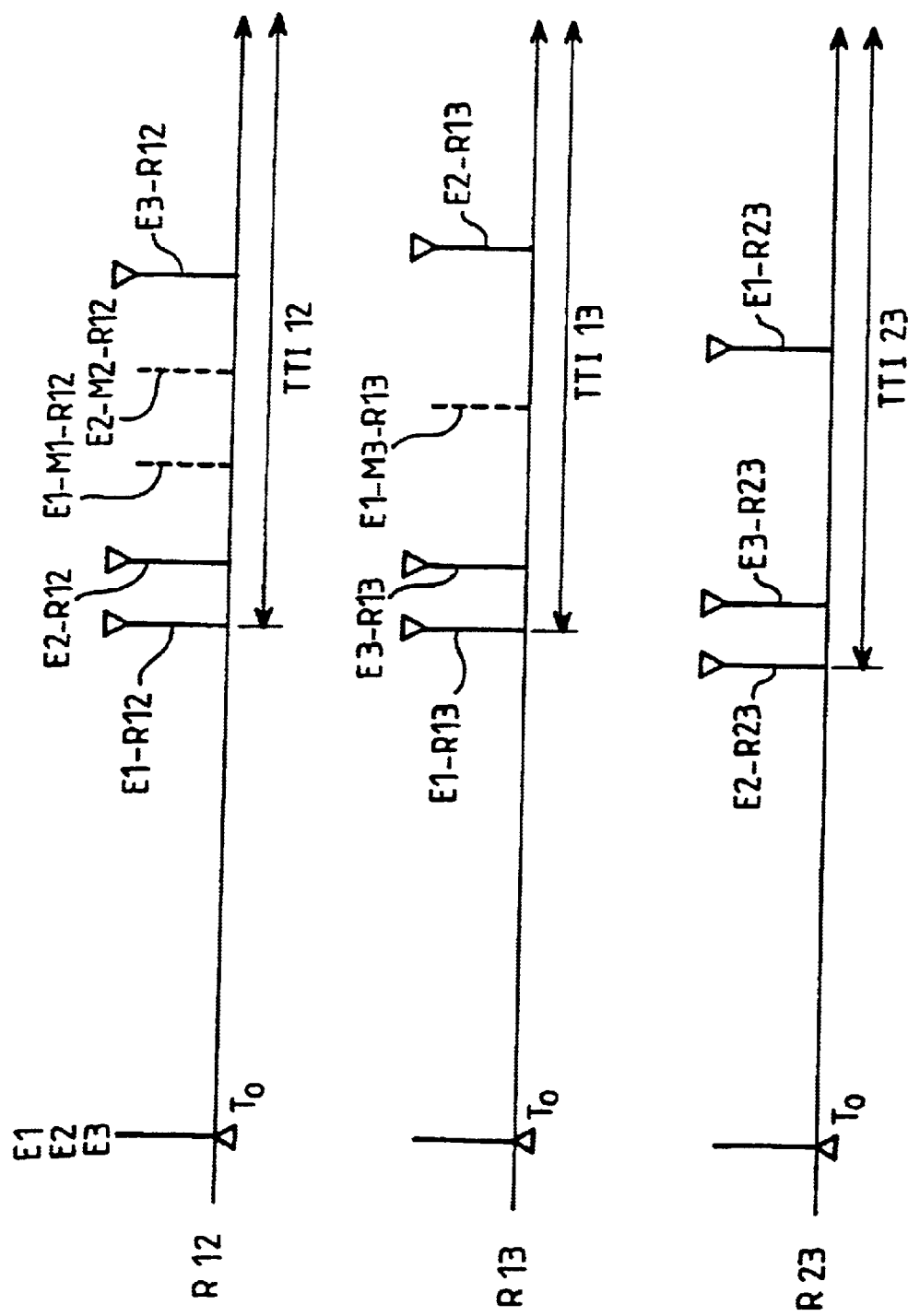
FIG. 8 is a group of time charts showing an exemplary apportioning of signals received.

FIG. 8 shows explicitly a simplified example of a succession of echoes over time, which travels from left to right. The three lines of this FIG. 8 relate, from the top downwards, to the receivers R12, R13 and R23. The transmitted signals are marked at the bottom by an upward pointing triangle; the direct paths received are marked at the top by a downward pointing triangle; the echoes (all Doppler bins combined) are marked by vertical dashes. Perfect synchronization of the transmitters is assumed at $T_0$ (it would be sufficient for the temporal discrepancies of the transmitters with respect to this perfect synchronization to be known).

Each receiver, knowing where it lies, identifies without error the direct-path receptions.

R12 firstly receives the direct path E1–R12 from the transmitter E1, then that E2–R12 from E2; there follow a first echo R12(u,1) of the to the action Eu-m(1)-R12 of a transmitter on a mobile body M(1), and a second echo R12(v,2) of the form Ev-M(2)-R12; lastly comes the direct path E3–R12.

R13 firstly receives the direct paths E1–R13, then E3–R13; there follows an echo R13(w,3) of the form Ew-M(3)-R13; lastly comes the direct path E2–R13.

R23 receives the direct paths E2–R23, then E3–R23 and finally E1–R23, but no echo.

For each receiver, the "instrumented time slot" (TTI12, TTI13, TTI23) begins at the first direct path received, and terminates with the last useful signal received (not represented).

The most probable, temporally, is that the echoes R12u1 and R12v2 are due respectively to the transmitters E1 and E2 (but the knowledge of the past positions and motions of mobile bodies may lead to another situation). We therefore have u=1 and v=2, as indicated a priori in the drawing. For the same reason w=1.

The ordered temporal association processing will make it possible here to identify the mobile bodies M(1), M(2) and M(3) with one and the same mobile body M.

Preferably, this processing involves several receivers (R12, R23, R13) jointly. They must therefore communicate via appropriate links between themselves and/or with a central station, which contrasts the radar plots provided by these receivers. This makes it possible to switch from the slices of ellipsoids to their intersection which gives a position. The central station can lie at the level of one of the receivers.

One or more of the receivers and/or the central station can address service information to the telebroadcasting transmitters for the purposes of retransmission in their modulation (renting of channels in the telebroadcasting system itself). This service information can relate to the working parameters of the system, or even to the results. The information is then available at the output of the receiver 110.

Another important idea of the present invention is the systematic recourse to multistatic detection: bi-static detection alone may induce desensitizations related to blind zones, in particular in the case of moving echoes much like ground clutter.

For this purpose, the invention furthermore envisages that the existing telebroadcasting radio transmitters be supplemented with similar additional transmitters (COFDM modulation), but which may be "dedicated" to detection.

These transmitters, synchronized with those of the broadcasting network, will therefore introduce no type of jamming, provided that their installation rules are the same.

Such auxiliary transmitters may be installed in zones of shadow or blind zones, or else exactly where the relief of the terrain has led to acceptance of a limited telebroadcasting service. They may also be installed exactly where the geographical arrangement of the telebroadcasting transmitters deviates excessively from the ideal configurations for multistatic detection, or else at the places where better accuracy is desired. They may also be envisaged in the form of mobile units, including transmitters and receivers.

The receiver 100 can have parts in common with the pathway receiver 10-1 associated with the same antenna element. It can also work with a separate aerial, possibly rendered omni-directional.

Of course, the invention is not limited to the elements described. In particular, the expression "telebroadcasting" covers not only transmissions of television type, but also, more generally, any form of remote information transmission by a radioelectric pathway.

*ANNEX – FORMULAE*

$$X(t) = \sum_{j=-\infty}^{+\infty} symb_j(t) \quad (1)$$

$$symb_j(t) = \sum_{k=0}^{N-1} C_{j,k} \Psi_{j,k}(t) \quad (2)$$

$$\Psi_{j,k}(t) = g_k(t - jD_s) \quad (3)$$

$$\begin{cases} -\Delta \le t < T_s & g_k(t) = e^{2i\pi f_k t} \\ \text{elsewhere} & = 0 \end{cases} \quad (4)$$

$$C_{j,k} \in \{1 + i, 1 - i, -1 + i, -1 - i\} \quad (5)$$

$$\Psi_{j,k}(t) = g_k(t - jD_s) = e^{2i\pi f_k(t - jD_s)} \quad (6)$$

What is claimed is:

1. A receiver for detecting mobile objects, using digital telebroadcast terrestrial radio transmissions, made by transmitters that commonly operate based on a plurality of fixed frequency carriers, afforded a symbol-based digital modulation, processed by carrier-wise orthogonal frequency multiplexing, the receiver comprising:

radioelectric reception means for picking up signals backscattered by objects under effect of said radio transmitters;

processing means for performing a discrimination of the objects according to distance/Doppler bins; and auxiliary means for acquiring a synchronization reference with respect to the transmitters, to clamp the distance/Doppler bins in time, wherein the auxiliary means comprises means for receiving and demodulating the direct radio telebroadcast signal received from at least one of the transmitters, to determine instants of synchronization and symbols of the at least one of the transmitters;

and wherein the processing means comprises:

Doppler distribution means for apportioning signals received according to a plurality of Doppler pathways, while affording signals in each pathway a frequency shift associated with a rank of the respective Doppler pathway, distance compression means for forming a sum for all the carriers of correlations, in homologous forms, of an output of each Doppler pathway with symbols available at an output of the auxiliary means, thereby yielding samples arranged in the distance/Doppler bins, means for coherent Doppler integration over a chosen time, thereby yielding integrated distance/Doppler bins, and means for postprocessing with tracking, to contrast echoes obtained in the integrated distance/Doppler bins, to obtain radar plots containing position/velocity information on one or more of the objects.

2. The receiver as claimed in claim 1, wherein the receiver further comprises, at an output of the radioelectric reception means, an analog/digital converter, followed by a HILBERT transform stage, to obtain amplitude/phase complex digital signals, and wherein the Doppler distribution means and subsequent stages operate digitally.

3. The receiver as claimed in claim 2, wherein the distance compression means comprises Fourier transformation stages on sliding temporal data trains arising from Doppler distribution, thereby regenerating the symbols as received, temporal correlators receiving outputs of the auxiliary means, and a summator receiving outputs of the temporal correlators for a set of carriers.

4. The receiver as claimed in claim 1, wherein the radioelectric reception means comprises an array antenna, wherein the processing means operate selectively on pathways respectively associated with distinct antenna elements or groups of antenna elements, up to the postprocessing means, which at a head end comprises beam recombination means for recombination of outputs of the pathways, with a view to beam formation.

5. The receiver as claimed in claim 1, wherein the beam recombination means operate adaptively, as a function of mobile objects tracked and echoes observed.

6. The receiver as claimed in claim 1, wherein the postprocessing means comprises detection means with a constant false alarm rate.

7. The receiver as claimed in claim 1, wherein the postprocessing means comprises a multistatic processing stage, for defining each radar plot based on a plurality of transmitter/receiver pairs.

8. A system for detecting mobile objects, comprising plural receivers according to claim 1, sited at chosen places, and means for contrasting radar plots that the plural receivers yield.

9. A system as claimed in claim 8, further comprising means for addressing service information to the telebroadcasting transmitters, for retransmission in their modulation.

10. A system as claimed in claim 8, further comprising additional transmitters sited at chosen places and operating with a same modulation as the telebroadcasting transmitters.

* * * * *